(12) United States Patent
Wilson et al.

(10) Patent No.: US 8,135,827 B2
(45) Date of Patent: *Mar. 13, 2012

(54) DISTRIBUTED CAPTURE AND AGGREGATION OF DYNAMIC APPLICATION USAGE INFORMATION

(75) Inventors: Andrew S. Wilson, Manchester, NH (US); Brian J. Shin, Boston, MA (US); David Angel, Mechanicsville, VA (US)

(73) Assignee: Visible Measures Corp., Boston, MA (US)

( * ) Notice: Subject to any disclaimer, the term of this patent is extended or adjusted under 35 U.S.C. 154(b) by 668 days.

This patent is subject to a terminal disclaimer.

(21) Appl. No.: 12/098,579

(22) Filed: Apr. 7, 2008

(65) Prior Publication Data
US 2010/0030785 A1 Feb. 4, 2010

Related U.S. Application Data

(63) Continuation of application No. 11/481,530, filed on Jul. 6, 2006, now Pat. No. 7,356,590.

(60) Provisional application No. 60/698,567, filed on Jul. 12, 2005.

(51) Int. Cl.
*G06F 15/173* (2006.01)
*G06F 15/16* (2006.01)
*G06F 15/177* (2006.01)

(52) U.S. Cl. ........... 709/224; 719/328; 719/311; 714/25

(58) Field of Classification Search .......... 709/217–228, 709/200–203; 719/311, 328; 714/2, 25
See application file for complete search history.

(56) References Cited

U.S. PATENT DOCUMENTS

| 6,073,241 | A | 6/2000 | Rosenberg et al. |
| 6,353,929 | B1 | 3/2002 | Houston |
| 6,470,388 | B1 | 10/2002 | Niemi et al. |
| 6,591,228 | B1 | 7/2003 | Hall et al. |
| 7,356,590 | B2* | 4/2008 | Wilson et al. ................. 709/224 |
| 7,689,682 | B1 | 3/2010 | Eldering et al. |
| 2002/0007317 | A1 | 1/2002 | Callaghan et al. |
| 2003/0144873 | A1 | 7/2003 | Keshel |

(Continued)

OTHER PUBLICATIONS

Hamilton, "Java Logging APIs", Oct. 18, 2000, p. 1.

(Continued)

*Primary Examiner* — Haresh N Patel
(74) *Attorney, Agent, or Firm* — David H. Judson

(57) ABSTRACT

A web-based hosted solution through which application developers create, manage and monitor application usage analytics in an online manner. Preferably, an application under test is one of: application software, a script-enabled web application, or a rich Internet application (RIA). During the development process, a usage monitoring API is integrated into the application and the application is deployed. As users interact with the application, a log file is generated, typically in one of two ways. If the application is able to write to a local file system (in the user's machine), usage information is gathered in a log file local to the deployed application and then dispatched to an upload server for processing in a batch manner. If the application is not able to write to the user machine's local file system, the usage information is sent to a remote logging server, preferably on a just-in-time basis, and then the log file is generated on the logging server. In either case, preferably the usage information that is tracked comprises "features," "faults" and "failures" of the application, independent of platform, location, and number of deployed application instances.

13 Claims, 7 Drawing Sheets

U.S. PATENT DOCUMENTS

| | | |
|---|---|---|
| 2004/0058675 A1 | 3/2004 | Lu et al. |
| 2004/0186738 A1 | 9/2004 | Reisman et al. |
| 2005/0125271 A1 | 6/2005 | Peltz |
| 2005/0138111 A1 | 6/2005 | Aton et al. |
| 2005/0216844 A1 | 9/2005 | Error et al. |
| 2006/0041902 A1 | 2/2006 | Zigmond |
| 2006/0075308 A1 | 4/2006 | Haselden et al. |
| 2006/0075390 A1* | 4/2006 | McAllister et al. ........... 717/128 |
| 2006/0271827 A1* | 11/2006 | Cascaval et al. ................ 714/39 |
| 2007/0233386 A1 | 10/2007 | Xie et al. |
| 2008/0066107 A1 | 3/2008 | Moonka et al. |
| 2008/0187279 A1 | 8/2008 | Gilley et al. |
| 2008/0261192 A1 | 10/2008 | Huang et al. |

OTHER PUBLICATIONS

First Office action, U.S. Appl. No. 11/964,479, Jul. 8, 2010, p. 1.
Second Office action, U.S. Appl. No. 11/964,479, Nov. 19, 2010, p. 1.
First Office action, China Application No. 200680033282.9, Dec. 25, 2009, p. 1.
First Office action, EP 06786477.7, Mar. 16, 2010, p. 1.

* cited by examiner

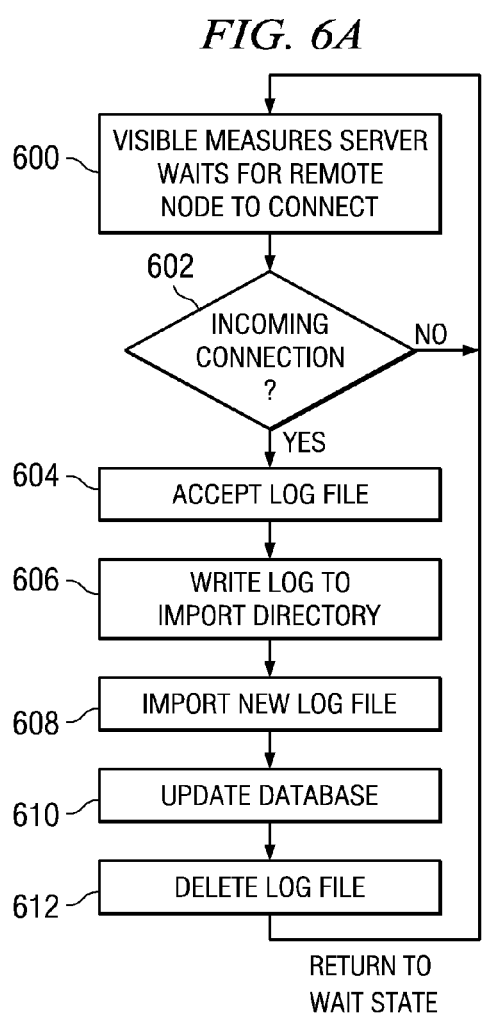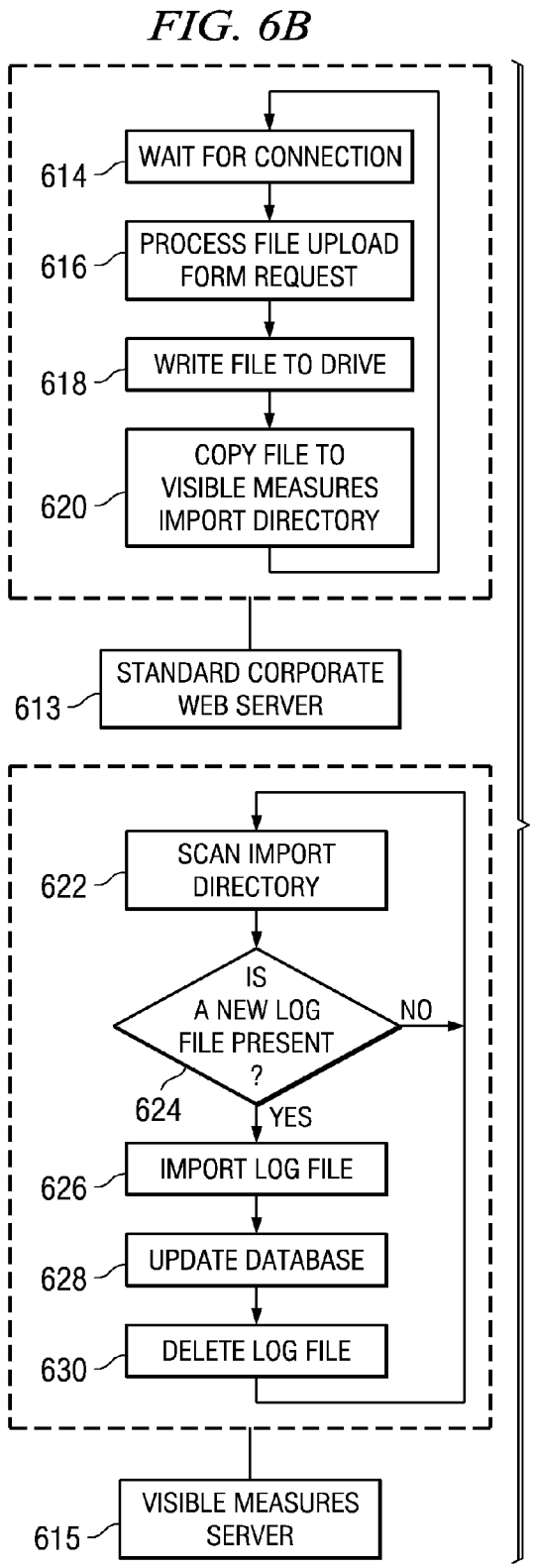

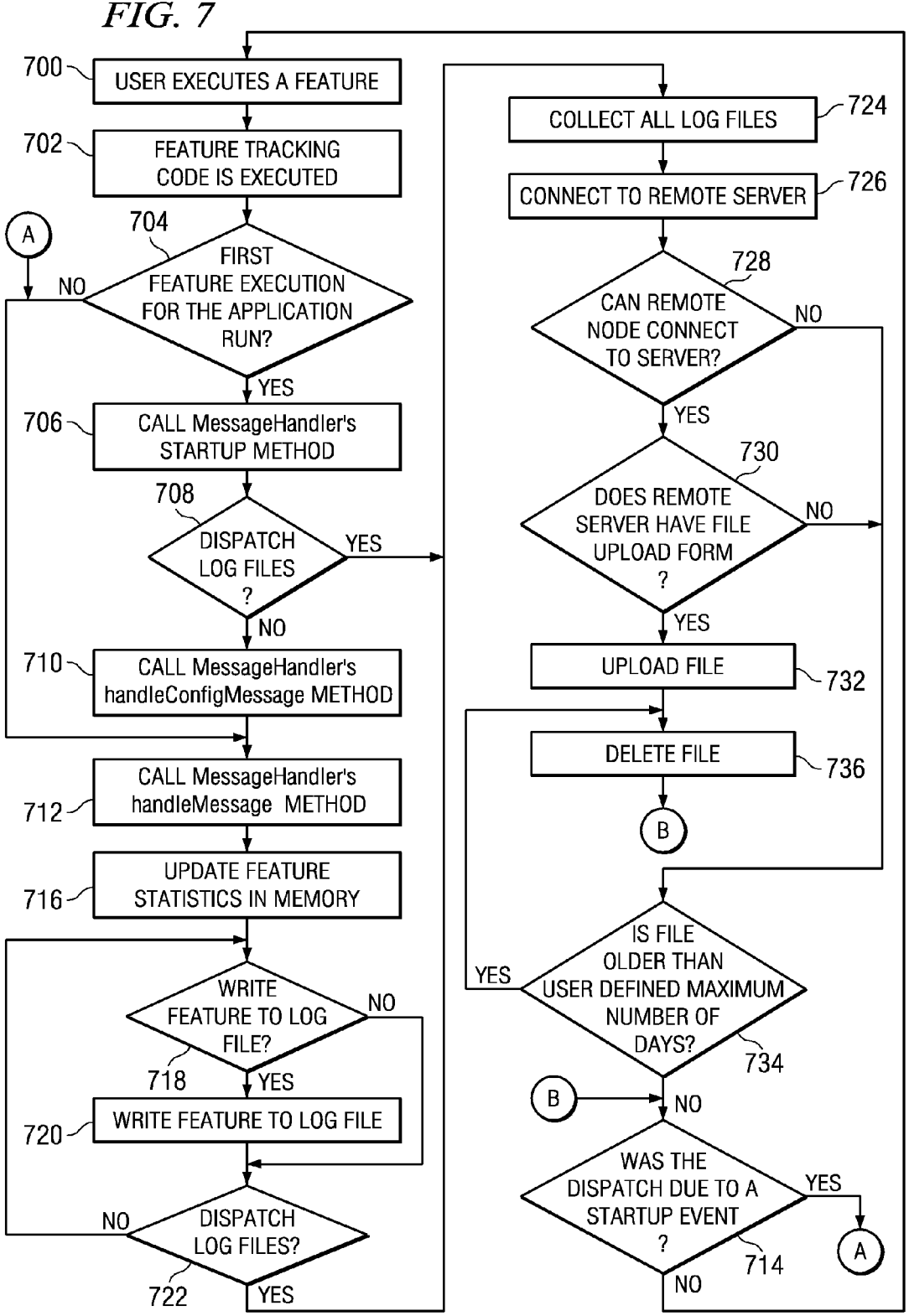

FIG. 8

```
form name="uploadForm" method="POST" action="\upload.do"
enctype="multipart/form-data">

<input type="file" name="file" value=" ">

<input type="submit" name="submit" value="Apply">

</form>
```

FIG. 9

```
public static void main(String[] args)
{
   // Scenario 1
      Messenger.storeFeature(MyTestHandler.instance(), "main");

// Scenario 2
      Messenger.storeFeature(MyTestHandler.instance(), "main2");

// Scenario 3
      Messenger.storeFailure(MyTestHandler.instance(), "main2", "File is invalid");

// Scenario 4
      Messenger.storeException(MyTestHandler.instance(), "main", e, null);
}
```

FIG. 10

| | | | |
|---|---|---|---|
| 00000000 | FA FA 56 69 73 69 62 6C | 65 4D 65 61 73 75 72 65 | . . VisibleMeasure |
| 00000010 | 73 4C 6F 67 30 32 30 31 | 0D 04 E8 C9 ED 00 00 01 | sLog0201 . . . . . . . . |
| 00000020 | 0C 24 E8 C9 ED 1F 34 30 | 32 38 38 30 38 32 30 62 | .$....402880820b |
| 00000030 | 34 66 66 36 63 39 30 31 | 30 62 34 66 66 69 34 34 | 4ff6c9010b4ff944 |
| 00000040 | 32 30 30 30 32 13 76 69 | 73 69 62 6C 65 6D 65 61 | 20002.visiblemea |
| 00000050 | 73 75 72 65 73 2E 63 6F | 6D 00 08 00 00 00 01 22 | sures.com. . . . . ." |
| 00000060 | 06 54 79 70 65 3D 31 15 | 6A 61 76 61 2E 76 65 72 | .Type=1. java.ver |
| 00000070 | 73 69 6F 6E 3D 31 2E 34 | 2E 32 5F 30 39 27 6A 61 | sion=1.4.2_09'ja |
| 00000080 | 76 61 2E 76 6D 2E 6E 61 | 6D 65 3D 4A 61 76 61 20 | va.vm.name=Java |
| 00000090 | 48 6F 74 53 70 6F 74 28 | 54 4D 29 20 43 6C 69 65 | HotSpot(TM) Clie |
| 000000a0 | 6E 74 20 56 4D 60 6A 61 | 76 61 2E 63 6C 61 73 73 | nt VM'java.class |
| 000000b0 | 2E 70 61 74 68 3D 2E 5C | 72 65 64 69 73 74 72 69 | .path=.\ redistri |
| 000000c0 | 62 5C 56 69 73 69 62 6C | 65 4D 65 61 73 75 72 65 | b\VisibleMeasure |
| 000000d0 | 73 4C 6F 67 2E 6A 61 72 | 3B 2E 5C 72 65 64 69 73 | sLog.jar; .\redis |
| 000000e0 | 74 72 69 62 5C 68 74 74 | 70 2D 56 69 73 69 62 6C | trib\http-Visibl |
| 000000f0 | 65 4D 65 61 73 75 72 65 | 73 4C 6F 67 2E 6A 61 72 | eMeasuresLog.jar |
| 00000100 | 3B 2E 5C 62 69 6E 12 74 | 69 6D 65 3D 31 31 35 31 | ;.\bin.time=1151 |
| 00000110 | 36 37 30 34 37 31 31 34 | 39 0E 6F 73 2E 76 65 72 | 670471149.os.ver |
| 00000120 | 73 69 6F 6E 3D 35 2E 31 | 2F 6A 61 76 61 2E 73 70 | sion=5.1/java.sp |
| 00000130 | 65 63 69 66 69 63 61 74 | 69 6F 6E 2E 76 65 6E 64 | ecification.vend |
| 00000140 | 6F 72 3D 53 75 6E 20 4D | 69 63 72 6F 73 79 73 74 | or=Sun Microsyst |
| 00000150 | 65 6D 73 20 49 6E 63 2E | 17 6A 61 76 61 2E 63 6C | ems Inc. . java.cl |
| 00000160 | 61 73 73 2E 76 65 72 73 | 69 6F 6E 3D 34 38 2E 30 | ass. version=48.0 |
| 00000170 | 10 66 69 6C 65 2E 73 65 | 70 61 72 61 74 6F 72 3D | .file.separator= |
| 00000180 | 5C 0B 6F 73 2E 61 72 63 | 68 3D 78 38 36 1C 6A 61 | \.os.arch=x86.ja |
| 00000190 | 76 61 2E 76 6D 2E 76 65 | 72 73 69 6F 6E 3D 31 2E | va.vm.version=1. |
| 000001a0 | 34 2E 32 5F 30 39 2D 62 | 30 35 11 6C 69 6E 65 2E | 4.2_09-b05.line. |
| 000001b0 | 73 65 70 61 72 61 74 6F | 72 3D 0D 0A 36 6A 61 76 | separator=..6jav |
| 000001c0 | 61 2E 69 6F 2E 74 6D 70 | 64 69 72 3D 43 3A 5C 44 | a.io.tmpdir=C:\D |
| 000001d0 | 4F 43 55 4D 45 7E 31 5C | 41 57 49 4C 53 4F 7E 31 | OCUME~1\AWILSO~1 |
| 000001e0 | 2E 45 4D 50 5C 4C 4F 43 | 41 4C 53 7E 31 5C 54 65 | .EMP\LOCALS~1\Te |
| 000001f0 | 6D 70 5C 1E 6A 61 76 61 | 2E 68 6F 6D 65 3D 63 3A | mp\.java.home=c: |
| 00000200 | 5C 6A 32 73 64 6B 31 2E | 34 2E 32 5F 30 39 5C 6A | \j2sdk1.4.2_09\j |
| 00000210 | 72 65 11 75 73 65 72 2E | 6E 61 6D 65 3D 61 77 69 | re.user.name=awi |

DISTRIBUTED CAPTURE AND AGGREGATION OF DYNAMIC APPLICATION USAGE INFORMATION

This application is a continuation of Ser. No. 11/481,530, filed Jul. 6, 2006, now U.S. Pat. No. 7,356,590, which application was based on and claimed priority from Ser. No. 60/698,567, filed Jul. 12, 2005.

This application includes subject matter that is protected by copyright.

BACKGROUND OF THE INVENTION

1. Technical Field

The present invention relates generally to software monitoring, tracking, and return on investment (ROI) analysis.

2. Description of the Related Art

Powerful trends are reshaping the way the software industry operates and the way software is being developed. The biggest trend is arguably the one toward running Information Technology (IT) as a business. The United States Department of Commerce estimates that 50% of all capital spending is spent on IT and software. According to published studies, a not-insignificant portion of this spending is wasted because of the lack of metrics regarding productivity and ROI, and because during the software development process developers lack the ability to gather feedback easily from users and customers. Without such feedback, developers and product managers cannot determine which features of an application are most popular, which features cause the most problems when the software is used, and the like. Decisions about where to optimally allocate and leverage development resources thus are uninformed. The problem is exacerbated as software development and testing activities become distributed around the world. In the past, developers and IT managers have attempted to ascertain and evaluate application usage information through various techniques including guess-estimation, user surveys and focus groups, but such techniques typically represent only a small sampling of a customer base, and they often contain inaccurate and untimely data.

It is known in the prior art to provide methods and systems for centrally coordinating, collecting and storing error, trace, audit and other information in a computer network. A representative example is U.S. Pat. No. 6,470,388, issued to Niemi et al. In this patent, selected applications or processes running at various entities or hosts within the network instantiate one or more "debug" objects that collect given information. Each entity also includes at least one logging service layer that communicates with the application or process, and includes a communications resource and one or more state machine engines. In response to collecting error, trace, audit or other information, each debug object passes that data to the respective logging service layer, which decides whether to forward the data to a centralized logging facility disposed within the network. The forwarding of collected information depends on the state of the debug object. At the centralized logging facility, the information is time-stamped and appended to a log file along with the application's name and the name of the entity or host at which the application is running.

Another representative patent is U.S. Pat. No. 6,591,228, issued to Hall et al. In this patent, a logging service logs to a centralized log diagnostic messages from applications executing in a computing environment in which a plurality of mainframes are coupled to data storage area. Each mainframe has one or more subsystems that execute applications. A logging service API writes diagnostic messages to the data storage and, depending on the type of problem, contacts an alert facility.

While the above-described application logging techniques are generally useful, they work across homogeneous computer environments, using a relatively modest number of tracked systems, and they collect a relatively constrained set of information. There remains a need in the art to provide methods and systems that track application usage information independent of platform, location and number of deployed application instances, especially in the context of the software development process.

The present invention addresses the need in the art.

BRIEF SUMMARY OF THE INVENTION

The subject matter herein relates to a software platform that delivers business value analytics for technology optimization, especially during the software development process. Generally, a tracking platform is run as a hosted (or managed) service to monitor, collect and aggregate application usage information. It is assumed that an application under test is being executed on a set of distributed machines, such as end user client machines. The application is instrumented to collect the usage information, which in one embodiment is then transported reliably to a central location, where it is aggregated and exported for viewing. By collecting and measuring detailed usage information about an application, the service helps software developers build high quality software applications more efficiently. The system preferably exports a web interface to enable users (e.g., IT managers, application developers and the like) to transact with the system over the Internet using conventional technologies (a computer having a web browser and network connectivity) and using standard communication techniques (HTTP, secure HTTP, SOAP-based web service, or the like). Alternatively, the system is implemented as an extranet, over a private network, or the like. Preferably, entities access the hosted solution on a subscription basis, although a given entity may also elect to access the service on a transaction-based basis.

According to more specific aspects of this disclosure, the application under test is one of application software, a web application, or a rich internet application (RIA). During the development process, a usage monitoring API is integrated into the application and the application is deployed. As users interact with the application, a log file is generated, typically in one of two ways. If the application is able to write to a local file system (in the user's machine), usage information is gathered in a log file local to the deployed application and then dispatched to an upload server for processing in a batch manner. If the application is not able to write to the user machine's local file system (because, for example, it is a web application or RIA), the usage information is sent to a remote logging server, preferably on a just-in-time basis, and then the log file is generated on the logging server. In either case, preferably the usage information that is tracked comprises "features," "faults" and "failures" of the application, independent of platform, location, and number of deployed application instances. As used herein, "feature" data refers generally to a collection of information such as which features were used, when, in what order, by whom, on what platform, and with what end-user environment. The "fault" data refers generally to which features caused programmatic errors (e.g., exceptions). The "failures" data identifies which features failed to complete successfully, for example, if data was entered into a field in an incorrect format.

According to a further feature, the usage information or, more generally, the log file, is transmitted in a highly compact manner over the Internet (preferably using conventional HTTP transport) to allow for a high performance, distributed system with lightweight processing requirements.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

FIG. 6 illustrates representative logging server configurations according to the present invention;

FIG. 7 shows a representative process flow that occurs when a user executes a tracked feature;

FIG. 8 illustrates a representative HTML code snippet for the HTML form for a file transfer;

FIG. 9 is representative logging code for use in creating a log file; and

FIG. 10 is a representative log file illustrating the binary file format.

DETAILED DESCRIPTION OF THE PREFERRED EMBODIMENT

Figure 1:
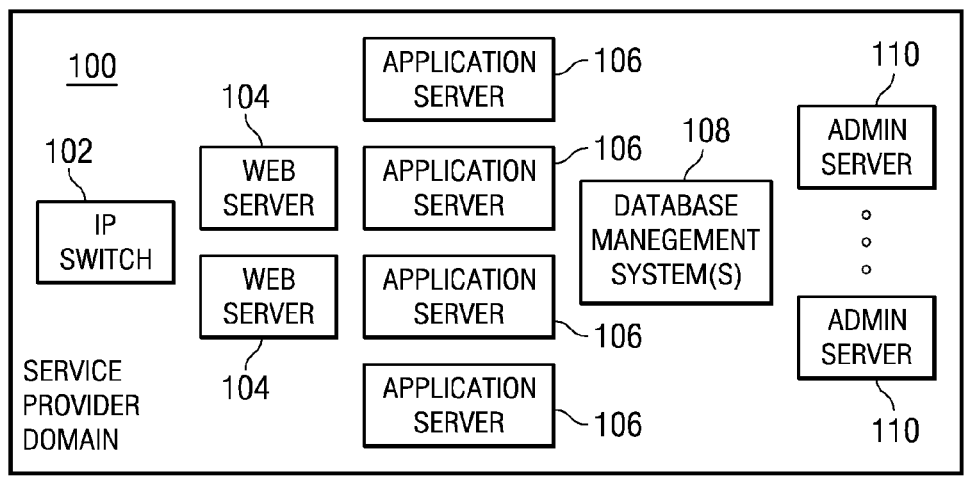
FIG. 1 is a block diagram of a service provider infrastructure for implementing a brand integration technology platform according to the present invention.

FIG. 1 illustrates a representative service provider or system architecture, which in the preferred embodiment is implemented in or across one or more data centers. A data center typically has connectivity to the Internet. In one embodiment, the system provides a web-based hosted solution through which application developers (or others such as IT personnel) create, manage and monitor application usage analytics in an online manner. Participants preferably interact with the platform as a hosted service. In an alternative embodiment, the system may be implemented over a private network, or as a product (as opposed to a hosted or managed service).

A user of the service has an Internet accessible machine such as a workstation or notebook computer. Typically, the user accesses the service provider architecture by opening a web browser on the machine to a URL associated with a service provider domain or sub-domain. The user then authenticates to the managed service in the usual manner, e.g., by entry of a username and password. The connection between the machine and the service provider infrastructure may be encrypted or otherwise secure, e.g., via SSL, or the like. Although connectivity via the publicly-routed Internet is typical, the user may connect to the service provider infrastructure over any local area, wide area, wireless, wired, private or other dedicated network. As seen in FIG. 1, the service provider architecture 100 comprises an IP switch 102, a set of one or more web server machines 104, a set of one more application server machines 106, a database management system 108, and a set of one or more administration server machines 110. A representative web server machine 104 comprises commodity hardware (e.g., Intel-based), an operating system such as Linux, and a web server such as Apache 2.x. A representative application server machine 106 comprises commodity hardware, Linux, and an application server. The database management system 108 may be implemented as an Oracle database management package. In a high volume use environment, there may be several web server machines, several application server machines, and a number of administrative server machines. Although not shown in detail, the infrastructure may include a name service, other load balancing appliances, other switches, network attached storage, and the like. The system typically will also include connectivity to external data sources, such as third party databases. Each machine in the system typically comprises sufficient disk and memory, as well as input and output devices. Generally, the web servers 104 handle incoming business entity provisioning requests, and they export a display interface that is described and illustrated in more detail below. The application servers 106 manage the data and facilitate the functions of the platform. The administrator servers 110 handle all back-end accounting and reporting functions. The particular hardware and software implementation details described herein are merely for illustrative purposes are not meant to limit the scope of the present invention.

Figure 2:
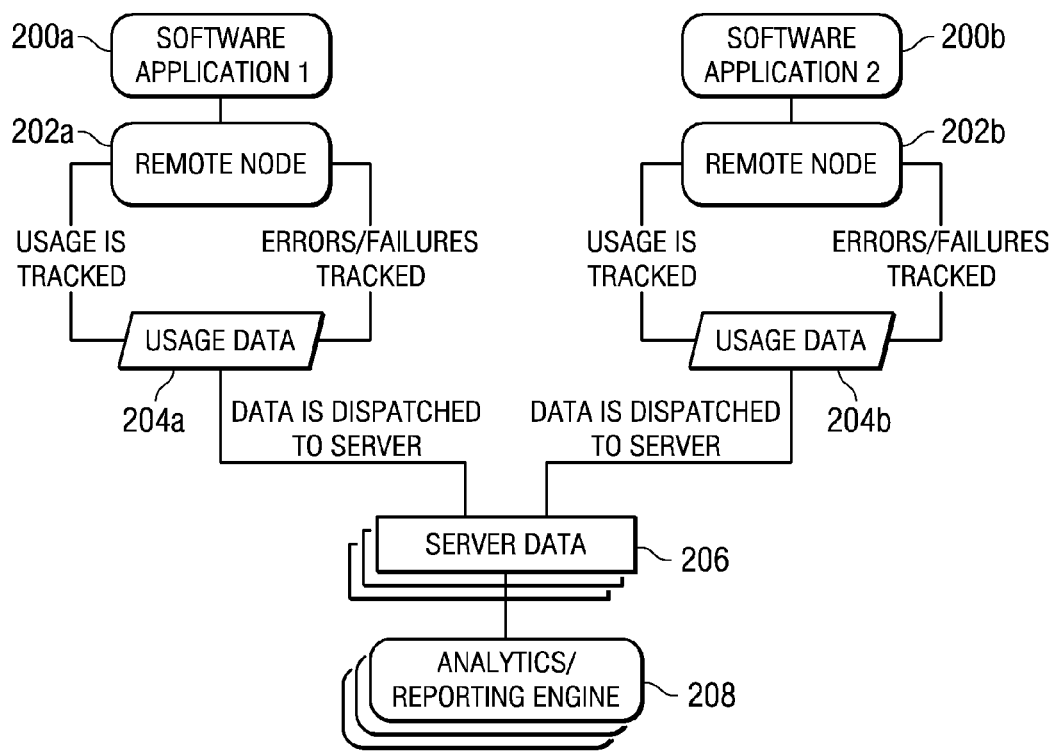
FIG. 2 illustrates the basic logging service of the present invention wherein application instances are instrumented to provide usage data sets that are then transported to a remote logging server.

FIG. 2 illustrates the basic operation of the logging service. In this example, application instances 200a and 200b have been instrumented with a usage monitoring API according to the invention. The usage monitoring API is sometimes referred to as a remote node. Thus, application instance 200a has associated therewith the remote node 202a and application instance 200b has associated therewith the remote node 202b. Of course, the use of two instances is merely illustrative, as the present invention is designed to provide a highly scalable distributed logging service wherein a large number of instances of the deployed application are instrumented and tracked. In operation, the remote node 202a generates usage data set 204a, and remote node 202b generates usage data set 204b. This usage data is transported in a highly efficient manner (as will be described below) to a central server (or to a set of servers), where the data sets are aggregated (reference numeral 206) and processed within an analytics and reporting engine 208.

Figure 3:
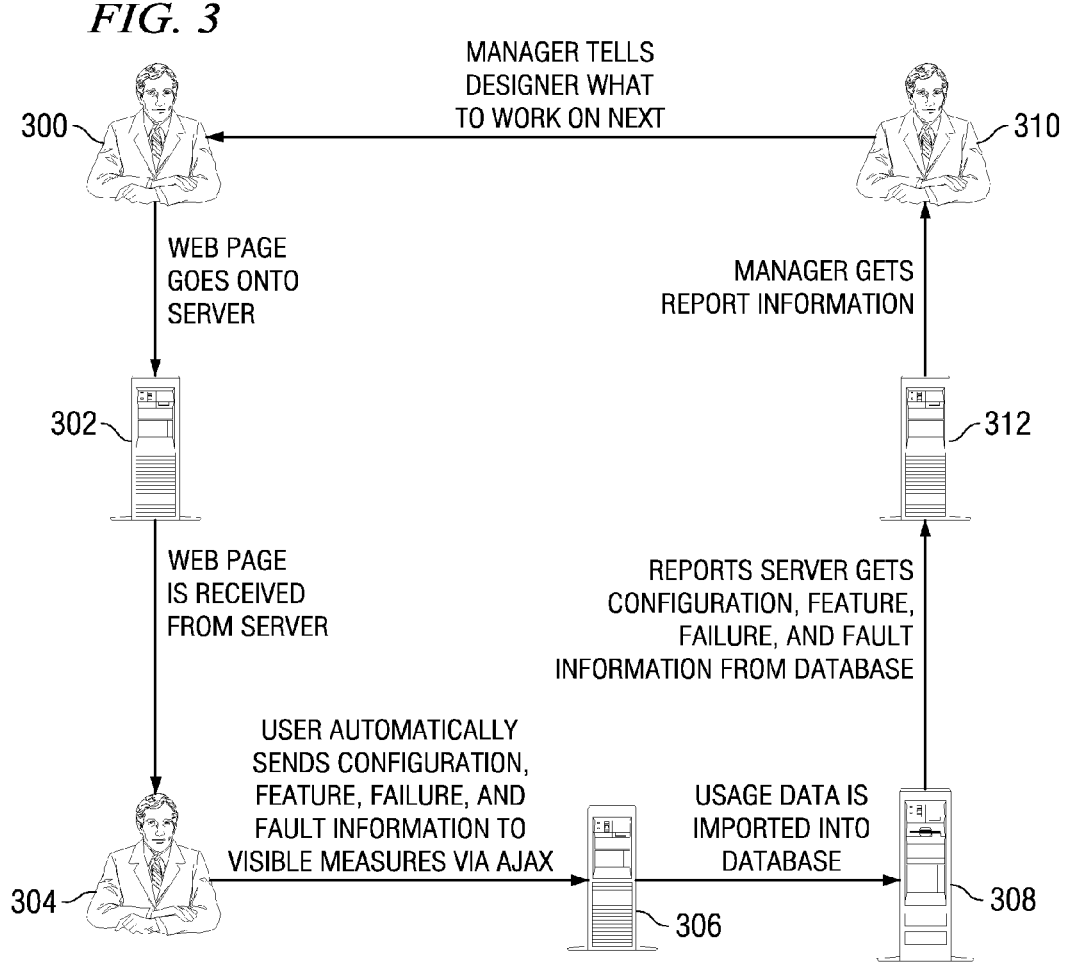
FIG. 3 illustrates how the hosted service can be used to provide feedback to a developer during a software development process.

The present invention is useful in the context of software development and testing, although one of ordinary skill in the art will appreciate that the invention is not limited to such use. FIG. 3 illustrates a representative business case. In this example, a web application developer 300 adds the usage monitoring API into the web application or rich Internet application under development. The application so instrumented is then made available from a web site or other publishing server 302. An end user 304 navigates to the site and downloads and interacts with the application to generate usage data. This data is sent to the logging server 306, which then uploads such data to the hosted service database 308. A manager 310 (or the developer 300) can then log into the hosted service web site 312 and access the logged data.

Figure 4:
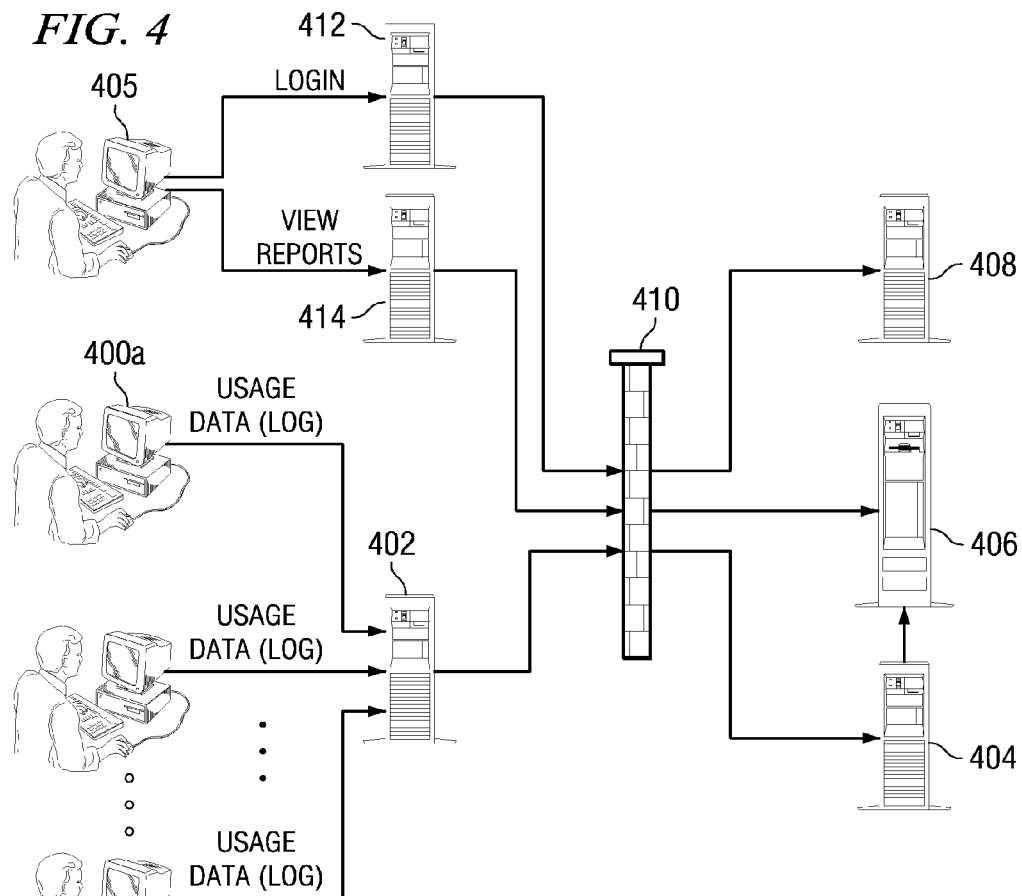
FIG. 4 provides a more detailed implementation of the hosted service.

FIG. 4 illustrates an operation of the hosted service in more detail. In this example, a large number of end users 400a-400n use the application and generate usage data sets that are provided to the logging server 402. The logging server 402 may comprise one or more servers. The logging server 402 periodically uploads the data sets through firewall 410 to an application server 404, which stores the processed data in a database 406. The user 405 of the hosted service logs into the service through server 412 and views the usage reports through server 414, which accesses the usage data through the firewall 410.

Preferably, the application under test is one of: application software (such as a program written in Java, Net, C++, C#, or the like), a script-enabled web application (such as a web page including Javascript, ActionScript or the like), or a rich Internet application (RIA) (e.g., Flash, AJAX-enabled, or the like). During the development process, a usage monitoring API is integrated into the application and the application is deployed. As users interact with the application, a log file is generated, typically in one of two ways. If the application is able to write to a local file system (in the user's machine), usage information is gathered in a log file local to the deployed application and then dispatched to an upload server for processing in a batch manner. If the application is not able to write to the user machine's local file system (because, for example, it is a web application or RIA), the usage information is sent to a remote logging server, preferably on a just-in-time basis, and then the log file is generated on the logging server. This is the technique used for Web browser-based logging. Preferably, such logging is accomplished by transmitting the data through http URL parameters to the logging server, which then translates the data into a log file. In either case, preferably the usage information that is tracked comprises "features," "faults" and "failures" of the application, independent of platform, location, and number of deployed application instances. As noted above, "feature" data refers generally to a collection of information such as which features were used, when, in what order, by whom, on what platform, and with what end-user environment. Typically, features are exposed to end users. The "fault" data refers generally to which features caused programmatic errors (e.g., exceptions). The "failures" data identifies which features failed to complete successfully, for example, if data was entered into a field in an incorrect format.

Thus, according to one illustrative use of the invention, a user of the hosted service instruments an application under development with tracking modules to better understand its beta customers as well as the progress of their beta testing. As noted above, preferably the "tracking modules" are embedded in (or otherwise associated with) the software application to be tracked. Usage data is sent back in a lightweight proprietary manner to an aggregation and reporting server.

The following description provides additional details of an embodiment where an application has the ability to write a log file to an end user machine local file system. In this embodiment, the hosted service platform collects data from the end users through a number of components that are now described. The first component is the remote node, which is responsible for collecting feature tracking and configuration information. The second component is the server, which takes the results of the remote node and combines it with data collected from other remote nodes. These two components make it possible for a user of the present invention to collect feature tracking and configuration information from many simultaneous nodes. There are also three important goals that the remote node should have. The first is that it must be easy to integrate. The second is that it must run fast. The third is that the transfer of information must be fast and appear incidental to the application's normal execution. Integration is made simple by preferably requiring only one line of code to be added per feature. The second goal is met by the application running fast because this one line of code, and its resulting calls, only introduce several milliseconds of overhead to an application per feature call. The third goal is met because the log file format ensures that the file will always be very small even under the worst of conditions, leading to very fast transfer times and low CPU utilization at those times, thus ensuring that the user's application does not perform poorly while a transfer is in progress. The following describes the remote node and all of its parts and then moves on the relevant server components.

The remote node collects feature tracking and configuration information for one instance of a given application. At some user defined point, the remote node attempts to connect to the server component and dispatch a series of log files. The remote component relies on several sub-components that collect and transfer this information. Some of these components require the user to perform certain implementation tasks. Table 1 below describes each component.

TABLE 1

| Component | Description |
| --- | --- |
| Messenger | User calls the messenger to store the execution of a feature. This component performs some processing of events, invokes the Message Handler to determine if the message should be logged and if it is appropriate to dispatch the log file. |
| Event | An object that contains interesting information concerning the state of a running application. |
| Message Handler | A user defined component that determines if a message should be stored, where to store it, when to dispatch the various event repositories, and where to dispatch it to. |
| Log Dispatcher | A component that allows the remote node to dispatch log files to a server. |
| Log File | A repository of feature and configuration events. |
| Log Writer | A component that stores event objects to a log file. |
| Server | An arbitrary HTTP server that provides access to a file upload form |
| File Upload Form | A specially formatted and named for used only for the transfer of log files from a remote node to a server. |
| Import | A component on the server that processes incoming log files and incorporates the log file's data into the main Visible Measures' database. |

These components will be described below. First, the following describes the flow of data between the remote node and the server in a representative embodiment. Then, the process of integrating these components into an application so that a user can collect feature tracking information is described.

Figure 5:
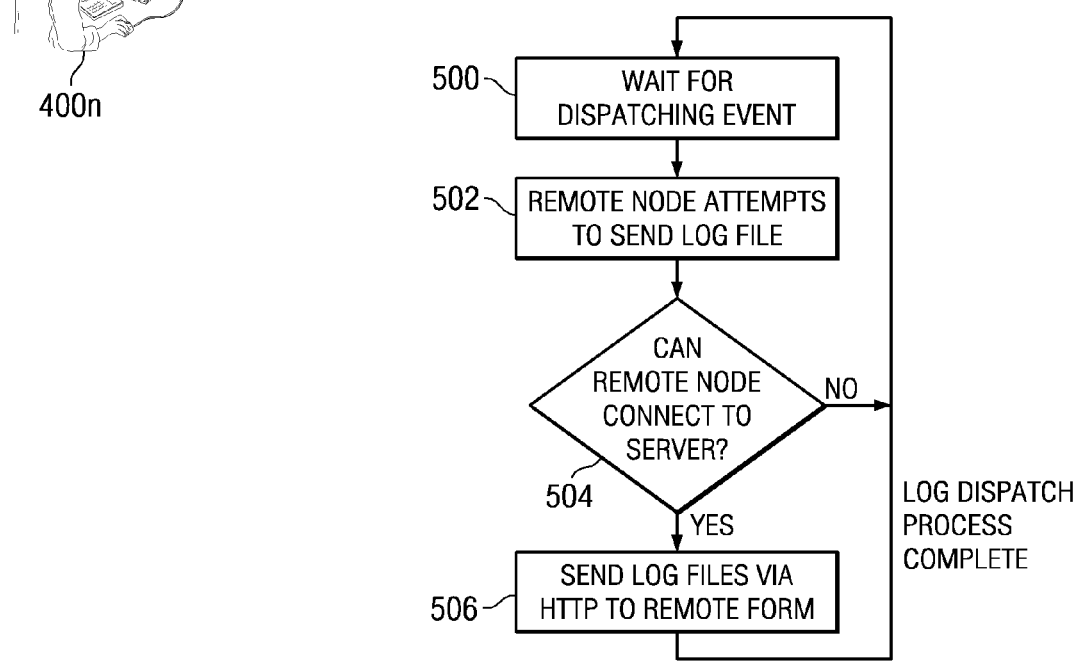
FIG. 5 is a simplified process flow diagram illustrating how a remote node interacts with a logging server.

Preferably, data flows in a single direction from the remote node to the server and the server does not communicate with the remote node. FIG. 5 illustrates a representative process flow. The process for transmitting data is straightforward. The remote node waits for a dispatching event 500, which causes the remote node to connect to a user defined URL. At step 502, the remote attempts to connect to the logging server. A test at step 504 determines whether the remote node can connect to the server. If so, the remote node then transfers all log files, preferably by submitting them to an HTML form on an HTML page specified by the URL. Preferably, the remote node then deletes the successfully dispatched log files. Moreover, preferably the remote node stores the log files for a user-defined number of days if a connection cannot be made to the server. The remote node also preferably checks the date of each log file after a failed dispatch event. The remote node then deletes the files that are older than the maximum number of days.

In this embodiment, the server side simply serves an HTML form for the file transfer to work as shown in the code snippet illustrated in FIG. 8. The remote node parses the HTML page and finds the upload form, sets the file field, and then submits the information. The step of finding the form ensures that the system does not try to arbitrarily perform a file upload on a form that cannot accept the incoming file. Upon receipt, the server writes the incoming log file to an import directory. The server's log import component preferably scans this directory at regular intervals. The import component opens the new log file and adds the data to the database.

Preferably, there are two basic configurations for the logging server to make available the file upload form. FIG. 6 illustrates the process flows for these configurations. The first configuration (type A) is shown in the top portion of the drawing. In this configuration, the server makes the form available and waits for remote nodes to connect. This is step 600. At step 602, a test is run to determine whether a remote node is attempting to connect. Upon receiving a connection, the server accepts the log file at step 604 and writes the log file to the import directory at step 606. At step 608, the new log file is imported into the service database. At step 610 the database is updated, after which the log file is deleted at step 612. The server then returns to a state to await another upload. The second configuration (type B) is typically implemented with the logging server located in the DMZ of an enterprise web site. In this implementation, an arbitrary HTTP server 613 serves the file transfer form and waits for the remote node connections at step 614. When a remote node connects, the server 613 processes the upload form request at step 616, writes the log file to a local drive 618 and, at step 620, copies the files to log import directory of the logging server 615 associated with the hosted service. The logging server 615 runs concurrently. In particular, logging server 615 scans the import directory at step 622. If a new log file is present as indicated by the test at step 624, the log file is imported at step 626, the database is updated at step 628, and the log file is deleted at step 630. The configuration B is more secure and reliable (as compared to configuration A), as the HTTP server can be an existing corporate HTTP server, such as the one used to serve the company's web pages. Configuration B also is more secure in the sense that no critical log data is accessible from the outside world. Further, the second configuration is more reliable in that the corporate web server is implemented to handle a large number of simultaneous users, and it is constantly monitored so that it can be brought back up quickly in the event of a failure.

In this embodiment, a software developer typically performs a series of steps to facilitate the collection of the feature and configuration information. In particular, the following steps describe how the developer instruments the application to generate the log data (familiarity with Java is presumed in the following):

1. Implement a derivation of a MessageHandler class.
2. Add a series of Messenger.store( . . . ) methods to the application's existing code. Each addition should be at the point in code that represents a given feature's entry point.
3. Update the application installation tool such that it collects HTTP proxy information and generates a configuration file readable by the developer's application and that can forward this information to the MessageHandler.

Each of the above steps will now be described in more detail.

Step 1

The MessageHandler is a Java abstract class. Consequently, according to the invention, an integrator derives a concrete implementation of this class that is specific to his or her application. This message handler performs a series of tasks, which are now described.

In a representative embodiment, the MessageHandler class is responsible for filtering and dispatching log files. An instance of the class typically begins with initialization code that sets a series of variables necessary for creating and dispatching a log file. Creating a log file typically requires the name of the integrator's domain name, such as mycompany.com, a unique 32 character identifier provided by the service provider's server, and project and build names. The 32 character unique identifier may be provided by the server to a user working through a user interface, or through any other convenient means. The identifier is created and displayed when the user creates a new build for a particular project. The user then copies that 32 character unique identifier into his MessageHandler class implementation. The 32 character identifier is used to match the log file data to a particular project and build on the service provider's server. The read data from the log file is then put into the server's data repository. Project and build names preferably are also used to match data to a project and build in the event that the 32 character identifier fails, e.g., due to a typographic error on the part of the developer. The MessageHandler's dispatching mechanism preferably also requires a destination URL and may include other optional items such as a login name, password, proxy server configurations, and additional code to script the process of transmitting a log file back to an import server. The MessageHandler may dispatch a log file at the time the application starts, stops, during configuration data collection or after a feature has been executed. The developer's implementation of these methods simply returns a "true" response, and the MessageHandler then automatically dispatches all (or some subset of the) log files in the system. Upon getting a "true" response, the dispatcher typically uses the proxy information, if present or necessary, to pass through a first intervening firewall and make a connection to the server specified in the URL parameter. The URL may require special login information or expose additional scripting. At this point, the dispatcher executes the additional login information and code to get a file upload form. The dispatcher then sends the log files through this form.

MessageHandler instances describe a set of methods that are explained below in Table 2.

TABLE 2

| Method | Description |
| --- | --- |
| Constructor | Called when the MessageHanlder instance is first created by the application. |
| HandleConfigMessage | Called by the Messenger prior to the first HandleMessage call. Allows the user to define custom configuration information. |
| HandleMessage | Called by the Messenger whenever a feature is executed. The user code may return true, which will cause the Messenger to dispatch the log files. Regardless of the return value, the messenger will then examine the event object to determine if the event has been processed. The event will not be stored if the event has been processed. |
| Shutdown | Called as the application is shutting down via the Java shutdown hook mechanism via the Messenger. The user code may return true, which will cause the Messenger to dispatch the log files. |
| Startup | Called during the processing of the first event by the Messenger prior to invoking the HandleConfigMessage( ) and HandleMessage( ) methods. The user code may return true, which will cause the Messenger to dispatch the log files. |

Typically, the Constructor method provides a significant amount of information concerning the initialization of the application. The code block in FIG. 10 is the MessageHandler abstract class. The various getXXX and setXXX methods allow the user to set critical configuration information.

The illustrated framework allows the user to define many elements to further enhance the ability of the application to transfer data. Table 3 below describes various methods and what operation they perform (with the asterisk methods being optional).

TABLE 3

| Method | Description |
| --- | --- |
| addFormElement* | Allows the user to set additional form element and values. Useful for building more complex file upload mechanisms that may require additional user name and password fields. |
| areMessagesEnabled enableMessages* | Returns true if message processing is allowed. User may turn on and off message processing. Turning off message processing means that messages will not be logged and log files cannot be transferred. |
| getBuildName | The name of the application's specific build in the form of a string. |
| getFormElements | A HashMap of all the custom form elements specified by calls to the addFormElement method. Called by the default LogDispatcher. |
| getLogDispatcher | An instance of the LogDispatcher that will send log files back to the server. The user has the option of replacing the default LogDispatcher with a custom implementation. This custom implementation may support any communication mechanism the user wishes. |
| getLoginName | The form on the server may be behind a basic HTTP authentication scheme. A custom LogDispatcher calls this method to get the name of an authorized user when using a multi-page authentication scheme. |
| getLoginPassword | A custom LogDispatcher calls this method to get the password of an authorized user when using a multi-page authentication scheme. The getLoginUser( ) method must return a user name for this method to work. |
| getLoginUrl | A custom LogDispatcher calls this method to get the URL for the HTML page containing the file upload form when using a multi-page authentication scheme. |
| getMaximumFileAge | Called by the Messenger to determine how long files may be stored on the system running the application containing the remote node component. |
| getProjectName | The name of the application's specific project in the form of a string. |
| getProxyServerHost | The default LogDispatcher calls this method to get the name of the proxy server in the same domain as that of the application running the remote node. |
| getProxyServerPort | The default LogDispatcher calls this method to get the port of the proxy server in the same domain as that of the application running the remote node. |

TABLE 3-continued

| Method | Description |
| --- | --- |
| getProxyUserName | The default LogDispatcher calls this method to get the name of the user to authenticate on proxy server in the same domain as that of the application running the remote node. |
| getProxyUserPassword | The default LogDispatcher calls this method to get the password of the user to authenticate on proxy server in the same domain as that of the application running the remote node. |
| getUrl | Called by the default LogDispatcher to get the URL of the html page containing the file upload form on the server. |
| getWorkDirectory | Returns the location where the Messenger should write log files prior to dispatching. |
| setBuildName | Sets the name of the build. Set during initialization of the customized MessageHandler. |
| setLogDispatcher* | Sets a customized LogDispatcher. Set during initialization of the customized MessageHandler. |
| setLoginName* | Sets the login name used by a customized LogDispatcher. Set during initialization of the customized MessageHandler. |
| setLoginPassword* | Sets the login password used by a customized LogDispatcher Set during initialization of the customized MessageHandler. |
| setLoginUrl* | Sets the login URL used by a customized LogDispatcher Set during initialization of the customized MessageHandler. |
| setMaximumFileAge* | Sets the maximum number of days to retain a given log file. Set during initialization of the customized MessageHandler. |
| setProjectName | Sets the project name. Set during initialization of the customized MessageHandler. |
| setProxyServerHost* | Sets the proxy server host. Set during initialization of the customized MessageHandler. |
| setProxyServerPort* | Sets the proxy server port. Set during initialization of the customized MessageHandler. |
| setProxyUserName* | Sets the user name for proxy authentication. Set during initialization of the customized MessageHandler. |
| setProxyUserPassword* | Sets the password for the user to be authenticated by the proxy server. Set during initialization of the customized MessageHandler. |
| setUrl | Sets the URL containing the file upload form. Set during initialization of the customized MessageHandler. |
| setWorkDirectory | Sets the directory where the Messenger will write log files. Set during initialization of the customized MessageHandler. |
| setDomain | A set method for unique name representing the domain of the company producing the application that is using the logging code. The value is used to match a log file to a project. |
| getDomain | A get method to obtain the current value of the domain name. |
| setKey | A set function for the unique 32 character string identifying the project and build to associate log file data. |
| getKey | A get function for the unique 32 character string identifying the project and build to associate log file data. |

The Messenger and LogDispatcher read these methods to persist and transfer log files.

Step 2

The Messenger.storefeature ( . . . ) method tracks feature data. It takes two parameters. The first is an instance of the customized message handler. The second is a string containing the name of the feature. The resulting information about the number of executions of the feature indicates the value of that feature. Of course, a highly used feature is often more valuable than a rarely or never used feature.

In a representative embodiment, the Messenger.storefeature ( . . . ) method is added to each feature entry point within the application.

Step 3

The remotely running application may be behind a transparent or authenticating proxy server. The user's application installation component should find this out and collect the proxy server's address, port, user name and password if necessary and then write this information to a configuration file that the custom MessageHandler instance can read. The MessageHandler should then call the setProxyServerHost( ), setProxyServerPort( . . . ), setProxyUserName( . . . ), setProxyUserPassword methods with the configured information.

These integration steps make it possible for the user's application to now collect and transfer feature-tracking information. FIG. 7 shows a representative process flow that occurs when a user executes a tracked feature. As seen in FIG. 7, the routine begins when a user executes a feature at step 700. At step 702, the feature tracking code is executed. A test is then run at step 704 to determine whether this is the first feature execution for the application run. If so, the MessageHandler startup method is called at step 706. A test is then run at step 708 to determine whether the log files should be dispatched. If not, the MessageHandler's handle configuration message method is called at step 710. The routine then calls the MessageHandler's handle message method at step 712, which step is also reached when the outcome of the test at step 714 is positive. Step 714 tests whether a dispatch is due to a startup event. After step 712, the feature statistics are updated at step 716. A test is then performed at step 718 to determine whether the feature should be written to the log file. If so, the log file is written at step 720. Following step 720, or if the outcome of the test at step 718 is negative, a test is performed at step 722 to determine whether the log files should be dispatched. If so, the remote node collects all log files at step 724, connects to the remote server at step 726, and then tests at step 728 to determine whether it can connect to the server. If so, a test is performed at step 730 to determine whether the remote server has a file upload form. If not, or if the outcome of the test at step 728 is negative, a test is performed at step 734 to determine if the file is older than a user-defined maximum number of days. After a positive outcome of the test at step 730, the file is uploaded at step 732. After step 732 or a positive outcome to step 734, the file is deleted at step 736 and control returns to the test at step 714 to complete the processing.

A log file preferably is a binary file containing a series of specially formatted events. Preferably, the file comprises aggregated feature information rather than one entry per feature execution (as is common in traditional log files) to ensure that the file is smaller than traditional log files. The use of aggregated feature information is not a limitation of the invention, however.

The format can be read and integrated into a database very efficiently because each field is well defined. Traditional log files have to be read line by line and then the data must be parsed out of the text. This is often difficult to implement and consequently error prone and performs poorly. The formatting is described in terms of number of unsigned bytes. The following key describes the nomenclature as defined by the Java Virtual Machine (JVM) Specification. In particular, U followed by a number is an unsigned 8-bit byte of the given length. U1 is a single unsigned while U4 represents 4 unsigned bytes. U followed by [ ] indicates that it is an array of bytes. A [ ] enclosing another field name indicates that that field name specifies the length of the array.

Each event construct preferably is derived from a based event format such as described in Table 4 below.

TABLE 4

| Field | Description |
| --- | --- |
| Event_Type | Each event has a numeric type associated with it. This type field makes it possible for the reader to know the format for the given event. |
| Event_Data_Length | The length of the data portion of the event. |
| Event_Data | The event data itself. |

Preferably, all events are derived from this one format. Consequently, the events preferably begin with Event_Type and Event_Data_Length but may not include the Event_Data section (as the events typically override this field with their specific implementations). In a representative embodiment, the file format is a collection of Base_Events.

A feature event type represents a series of feature invocations. Each feature may have one or more events in the log file. There are often many feature events in the log file for various features. Table 5 below describes the fields.

TABLE 5

| Field | Description |
| --- | --- |
| Feature_Name_Length | The length of the name field. |
| Feature_Name | The name of the feature. |
| Executions | The number of times the feature have been executed. |

A user configuration event type is generated by the integrator and allows storage of an arbitrary amount of additional configuration information. Table 6 below describes the fields.

TABLE 6

| Field | Description |
| --- | --- |
| Configuration_Entry_Name_Length | The length of the configuration entry name. |
| Configuration_Entry_Name | The configuration entry name. |
| Configuration_Entry_Value_Length | The length of the configuration's value. |
| Configuration_Entry_Value | The configuration entry's value. |

The following provides additional details regarding a preferred technique by which log files are processed and transported according to the invention. As noted above, preferably log files track features, faults and/or failures of a software application, and they are transported in a highly compact footprint to allow for high performance, lightweight processing in a scalable manner. To this end, a preferred log file format according to the invention is highly efficient, sequential, relative, and referential. Efficiency is achieved by using small messages, preferably in a binary file (as opposed to, say, XML or other human readable text), and by compressing whole numbers to save log file space. Preferably, all messages are written in order of their real world occurrence. Timestamps for messages preferably are relative to a first time-stamped message. Thus for example, assume a first message indicates that an event occurred at 12:00 and that a second message occurred at 12:01. The first message stores 12:00 in milliseconds from the UTC epoch date, and the second message is stored with the number of milliseconds between the first event and the second event. Once again, this encoding technique saves log file space. The reporting mechanism uses the time data to provide detailed information about when a user took a given action with respect to the application or when the application responded in a certain way. The reporting mechanism can segment the data so that feature usage information can be examined per hour, per day, per week, per month, or any other time scale. The log file format preferably is also referential, as some messages (e.g., like feature execution messages), reference standard feature messages. Moreover, preferably a feature message creates an index for a feature name and uses this index to count the number of feature invocations.

In a representative embodiment, there are several different scenarios that are tracked. In a first scenario, the code logs a first feature extraction. In such case, the feature logging code preferably opens a new log file and the logging code writes the following messages, preferably in order: project, configuration, node type and feature. In a second scenario, the code logs follow on feature executions. In this scenario, the logging code preferably adds just one message, indicating feature execution. In a third scenario, the logging code logs a feature failure. In this scenario, the logging code preferably adds just one message, indicating feature failure. Finally, in a last scenario, the logging code logs a feature fault. Just one message is created again, indicating a feature fault. Sample logging code with the associated logging statements is illustrated in FIG. 9.

Preferably, each log file is made up of a series of messages. Each message typically has some common formatting and then become message type specific. The following are illustrative message types:

NodeType Message—the type of deployed instance of software

Project Message—the project name, e.g., the name of the deployed instance of software that is being tracked Feature Name—the feature being tracked Startup Message—the time the application started up Feature Execution Message—the feature executed and when it executed Config Message—information about the environment and configuration in which the application is deployed UserConfig Message—placeholder for additional configuration information desired by the user of the API (e.g., gather more info about a server upon which an application is installed)

Feature Failure Message—information about a feature failing (feature fails to complete because for example, user entered improperly formatted data), the time it failed, and some info about why it failed Feature Fault Message—information about a fault occurring (exception), the time it occurred, and some info about why it occurred Feature Reset Message—mechanism to internally identify features taking up minimum data size—resets the feature count in case of very high number of features Subnode User Message—information about the configuration and environment of the end user's machine (e.g., what web browser used, etc.)

Subnode User Configuration—placeholder for customizable information about an end-user's configuration Subnode Feature Execution—features executed on the end user's configuration, versus features executed on a server (needed to track client processing in situation such as with Rich Internet Applications or DHTML executing on a end user client versus on the web application server)

Subnode Failure Message—failures encountered on end user's machine

Subnode Fault Message—faults occurring on end user's machine—e.g., Javascript runtime errors across browsers Subnode Reset Message—as with Feature Reset Message but for end-user features Sub Type Message—space to grow to track additional information Null Message—for testing purposes to align columns within log file to make them more easily discernable Preferably, the order of messages in a log file is as follows:
1. Project—preferably only one message is present per log file
2. Configuration—preferably only one message can be present per log file
3. User Configuration—0 or more can be present
4. Node Type—preferably only one message can be present per log file
5. {Startup|Feature|Sub Node User}—1 or more can be present per log file
6. {Feature|Feature Execution|Feature Failure|Feature Fault|Reset|Sub Node User|Sub Node User Configuration|Sub Node Feature Execution|Sub Node Failure|Sub Node Fault|Sub Node Reset}—0 or more can be present Data is stored in the log file in the manner of a database record, such as indicated below:

Message Format is "name": size

Type: 1 byte

Time Stamp: 3 bytes

Message Type Specific Data: variable length depending on the type of Message, e.g., Feature Execution Message or Subnode User Configuration or other To capture the desired information while still maintaining high performance goals for the feature tracking system, the log files preferably use a binary file format, which is now described in more detail. FIG. 10 illustrates a representative file format (with bytes represented as hexadecimal).

The following describes an encoding method for generating the binary file format and, in particular, that takes in a number and compresses it down to a smallest number of bytes possible. The method begins by initializing a buffer to a base value that represents zero, the smallest non-negative whole number. The most significant bit (MSB) for each byte in the buffer is reserved to indicate whether the byte is a part of a number or the end of a number. This means that only 7 bits of a byte actually contain a numeric value while the most significant bit is an indicator. The encoding process then goes on to break the number from 8 to 7 bits across the buffer, shifting the bits 7 places to the right. The MSB portions of the number are encoded within each byte of the buffer with the MSB set to 1. The final bits of the number are encoded with a 0 at the MSB. Decoding the number is a process of checking if the buffer's MSB bit is set to 1. If so, the routine reads 7 bits and then shifts the values left for seven bits into a target data type, such as a 32 or 64 bit data type. When the MSB is set to 0, the routine reads the remaining 7 bits, performs the same shift operation and terminates the read process. The result is the number used as the input for the encoder.

Thus, according to an embodiment of the invention, a data type represents a whole number that is compressed to fit into a smallest number of necessary bits. The scheme preferably works by breaking numbers across a series of bytes. The first N bytes have the most significant bit (MSB) set to 1xxx xxxx where x are the bits that represent the actual number. The last byte has its MSB set to 0xxx xxxx. How the scheme operates is best seen by example.

For example, the number 1 is stored according to the present scheme as 0000 0001. Normal encoding would be 0000 0000 0000 0000 0000 0000 0000 0001, taking up 4 bytes; as can be seen, the present scheme uses just 1 byte. As another example, the number 1,000 is stored as 1000 0111 0110 1000. Normal encoding would be 0000 0000 0000 0000 0000 0000 1110 1000, taking up 4 bytes, whereas the present scheme uses just 2 bytes. The number 100,000 is stored as 1000 0110 1000 1101 0010 0000. Normal encoding would be 0000 0000 0000 0001 1000 0110 1010 0000, once again taking up 4 bytes, wherein the present scheme uses just 3 bytes. This technique substantially reduces the log file size, especially as compared to human readable (e.g., XML) or even conventional binary number (4 byte) encoding.

The above-described log file format and the compressed data type enable the system to track very advanced software application usage data about features, failures and faults in a high performance manner that is transparent for the end user. Most of the log data, which are mostly numbers, are directly mapped from a disk representative to an in-memory representation. As a result, the data is very compact and can be loaded and transported very efficiently. Moreover, preferably, the location of the data is very specific and ordered, which facilitates reducing the overall size of the log file. Thus, in an illustrative embodiment, a log file comprises a series of messages. Each message represents some interesting event, such as a feature execution or failure. The messages are preferably formatted with specific formats and field lengths. Variable length fields preferably are prefixed with a field indicating the length of the following field. Numeric fields preferably are variable length but use the above-described data type. As described above, the encoding scheme enables a number to be stored within a binary field.

As previously noted, the hardware and software systems in which the invention is illustrated are merely representative. The invention may be practiced, typically in software, on one or more machines. Generalizing, a machine typically comprises commodity hardware and software, storage (e.g., disks, disk arrays, and the like) and memory (RAM, ROM, and the like). The particular machines used in the network are not a limitation of the present invention. A given machine includes network interfaces and software to connect the machine to a network in the usual manner. As illustrated in FIG. 1, the present invention may be implemented as a managed service (e.g., in an ASP model) using the illustrated set of machines, which are connected or connectable to one or more networks. More generally, the service is provided by an operator using a set of one or more computing-related entities (systems, machines, processes, programs, libraries, functions, or the like) that together facilitate or provide the inventive functionality described above. In a typical implementation, the service comprises a set of one or more computers. A representative machine is a network-based server running commodity (e.g. Pentium-class) hardware, an operating system (e.g., Linux, Windows, OS-X, or the like), an application runtime environment (e.g., Java, ASP), and a set of applications or processes (e.g., Java applets or servlets, linkable libraries, native code, or the like, depending on platform), that provide the functionality of a given system or subsystem. As described, the service may be implemented in a standalone server, or across a distributed set of machines. Typically, a server connects to the publicly-routable Internet, a corporate intranet, a private network, or any combination thereof, depending on the desired implementation environment.

The hosted service may be implemented in a multi-server cluster environment that is designed to scale efficiently. Each server is designated with a primary and secondary series of tasks. Preferably, one server is dynamically set to be a master server, which server determines the secondary tasks to be performed by all servers. All servers update their existence within a database, and the servers cooperate to determine which server will be the master. The servers in the cluster are assigned tasks (such as log import and event processing) by the master server.

Having described our invention, what we now claim is set forth below.

The invention claimed is:

1. A method of tracking an application that is deployed as a set of application instances, where the application is instrumented with a usage monitoring application programming interface (API) that generates a log file when the application is executed, the log file comprising data associated with a set of application feature executions, failures or faults, wherein the log file data comprises a set of messages associated with the application feature executions, failures and faults, wherein the set of messages are written in a sequential order of the application feature executions, failures and faults, comprising:

operating, at a service provider domain, an Internet-accessible infrastructure, the Internet-accessible infrastructure comprising a web server, an application server, and a database;

receiving, by the web server, log files generated by the instrumented applications, wherein information in at least one log file is encoded in a compact data structure, and wherein at least first and second messages of the set of messages each have timestamps, and wherein the timestamp of the second message is a function of the timestamp in the first message;

processing, by the application server, data aggregated from the received log files; and storing, in the database, aggregated log data;

exporting, from the database and to a permitted entity, aggregated log data;

where the application is one of: a server-based application, a web-based application, and a rich Internet application.

2. The method as described in claim 1 wherein the log files are received at the web server via http transport.

3. The method as described in claim 1 wherein the permitted entity is a provider of the application.

4. The method as described in claim 1 wherein the application instances are deployed across a public network and the log files are received from a set of end users that are located throughout the public network.

5. The method as described in claim 1 wherein a log file is generated at an end user machine.

6. The method as described in claim 1 wherein a log file is generated at a gateway server of the Internet-accessible infrastructure.

7. A non-transitory computer storage medium having computer-executable instructions for performing the method steps of claim 1.

8. Apparatus for tracking a web application deployed across a wide area network as the web application is used within local end user web browser environments, where the web application is instrumented with a web application usage monitoring application programming interface (API) that generates a log file when the web application is executed, the log file comprising a set of messages associated with application feature executions, failures and faults, wherein the set of messages are written in a sequential order of the application feature executions, failures and faults, the apparatus comprising:

an Internet-accessible infrastructure operating at a service provider domain, the Internet-accessible infrastructure comprising at least one web server, an application server, and a database, the Internet-accessible infrastructure comprising at least one hardware element;

the web server operative to receive log files generated by the instrumented web applications, wherein information in at least one log file comprises a set of messages encoded in a compact data structure, and wherein at least first and second messages of the set of messages each have timestamps, and wherein the timestamp of the second message is a function of the timestamp in the first message;

the application server operative to process data aggregated from the received log files;

the database operative to store aggregated log data; and the web server further operative to export, from the database and to a permitted entity, at least a portion of the aggregated log data;

where the web application is one of: a web page having a browser-enabled script, and a rich Internet application.

9. The apparatus as described in claim 8 wherein the application feature execution data is one of: a feature failure, and a feature fault.

10. The apparatus as described in claim 8 wherein the Internet-accessible infrastructure includes a login server to authenticate one or more users associated with the permitted entity.

11. The apparatus as described in claim 8 wherein the Internet-accessible infrastructure includes an administrative server to provide an accounting function associated with the web application tracking.

12. The apparatus as described in claim 8 wherein the Internet-accessible infrastructure includes a reporting server to provide a reporting function associated with the web application tracking.

13. The apparatus as described in claim 8 wherein at least a portion of the Internet-accessible infrastructure operates behind a firewall.

* * * * *